Aug. 28, 1934.  J. M. WARNER  1,972,000
MOTION PICTURE CAMERA SUPPORT
Filed April 17, 1934
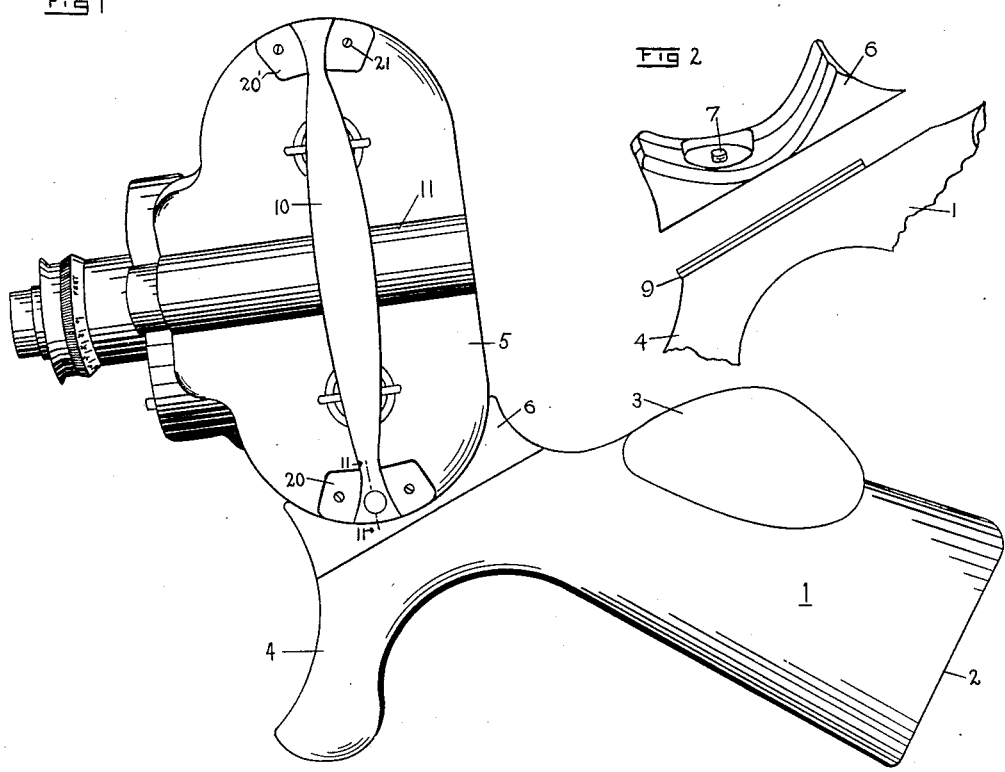
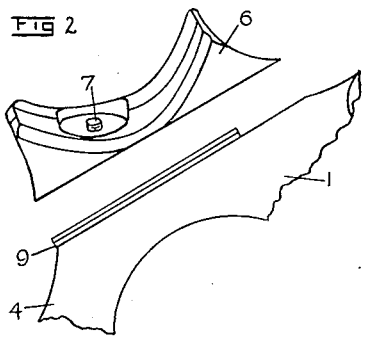
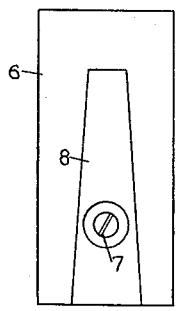
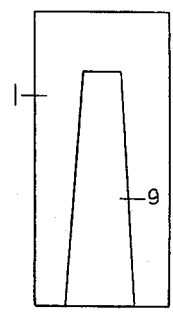
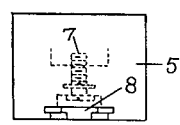
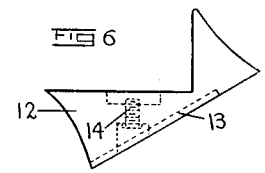
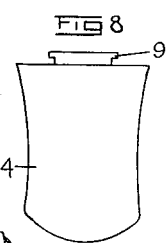
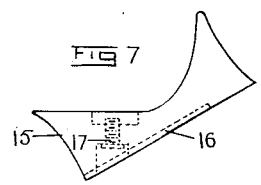
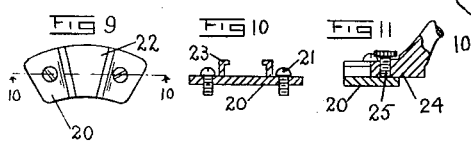
INVENTOR:
J. M. WARNER.
BY W. L. Beatty
ATTORNEY.

Patented Aug. 28, 1934

1,972,000

UNITED STATES PATENT OFFICE 1,972,000

MOTION PICTURE CAMERA SUPPORT

Jack M. Warner, Beverly Hills, Calif.

Application April 17, 1934, Serial No. 720,996

4 Claims. (Cl. 95—86)

This invention relates to motion picture cameras, and more specifically to a support for such cameras.

In the past it has been customary when photographing a rapidly moving action shot, such as a football game, with a motion picture camera of the 16 mm. or 35 mm. type to use either a tripod support or to hold the camera by hand so that the viewfinder thereof is adjacent the eye of the user. Both of these methods are unsatisfactory in that it is difficult to accurately follow the action when the camera is supported on a tripod and it is impossible to hold the camera steady when it is held by hand. This invention overcomes these difficulties by rigidly supporting the camera from the body of the user in such a manner that the viewfinder thereof is adjacent the eye of such user, whereby an action component may be easily and accurately photographed.

An object of the invention is to support a motion picture camera in such a manner that a rigid brace will be formed between the camera and the body of the cinematographer.

This is accomplished by providing a shoulder brace member having a hand grip integral therewith upon which a motion picture camera is supported.

Another object of the invention is to alternately support a plurality of motion picture cameras of different configuration from a single standard support.

This is accomplished by providing a brace member having a hand grip integral therewith, adapted to support a camera base plate, and an interchangeable camera supporting base plate member or adapter for each of such cameras.

Still another object of the invention is to support a motion picture camera adjacent the body of a user so that a rapidly moving action shot, such as the flight of a kicked football, may be accurately followed.

This is accomplished by providing a brace support for a motion picture camera and an auxiliary handle mounted on the side thereof, whereby the brace is supported against the shoulder of the cinematographer with one hand and the auxiliary handle is held with the other hand in such a manner that the viewfinder of the camera is adjacent the eye of the user.

For further details of the invention reference may be made to the drawing wherein:

Fig. 1 is a side elevation of a brace support with a Bell and Howell Eyemo motion picture camera mounted thereon.

Fig. 2 is a fragmentary view of the support of Fig. 1, prior to locking the camera support to the brace support.

Fig. 3 is a plan view of the base of the camera supporting member.

Fig. 4 is a plan view of the supporting face of the brace member.

Fig. 5 is a front elevation of the camera support of Fig. 2.

Fig. 6 is a side elevation of a camera support for an Eastman Cine-Kodak.

Fig. 7 is a side elevation of a camera support for a Victor 16 mm. camera.

Fig. 8 is a front elevation of the brace support of Fig. 2.

Fig. 9 is a front elevation of a handle-supporting plate.

Fig. 10 is a cross-section along the line 10—10 of Fig. 9.

Fig. 11 is a cross-section along the line 11—11 of Fig. 1.

Referring now to Fig. 1 the apparatus consists of a brace 1 having a surface 2 adapted to fit against the shoulder of a user. A cheek rest 3 is conveniently located on the support 1. A hand grip 4 is mounted on the forward end of the brace 1 in such a position that, when gripped, the apparatus may be firmly pressed against the shoulder of the user. A camera 5, shown in this case to be a standard Bell and Howell Eyemo, is fastened to an adapter or a supporting base plate 6 by means of a recessed screw 7, Fig. 2. As will be well understood the screw 7 is adapted to mate with a threaded aperture (not shown) in the base of camera 5. The supporting plate 6 is recessed to partially conform to the configuration of the base of the camera 5 so that when the screw 7 is firmly locked in the threaded aperture, above referred to, the camera 5 and the plate 6 form an integral unit. Plate 6, as shown in Figs. 3 and 5, has a tapered stepped recessed aperture 8 therein, adapted to accommodate a complementary T shaped male member 9, mounted on the forward face of the supporting member 1.

Two supporting plates 20 and 20' are suitably mounted on the side of the camera 5 by means of screws, such as 21. The plates 20 and 20' are similar, but are oppositely recessed so that a handle 10 may be withdrawn as described below. As shown in Figs. 9 and 10, the plate 20 has a tapered recessed portion 22 with an overhanging lip 23. An auxiliary handle 10 is fitted with a tapered shoe, such as 24, at either end thereof. The shoe 24 is complementary to and adapted to slide in the recessed portion of the plate 20. A locking screw 25 is provided in the shoe 24 so that the handle 10 may be locked in its normal position.

It is to be understood that the plates, such as 20, may be mounted on any camera in such a manner that the handle 10 will be interchangeable there-between.

In the operation of this device the plate 6 is placed over the bottom of the camera 5. The screw 7 is then advanced to mate with its corresponding threaded aperture (not shown) in the base of the camera 5 until the two are firmly fastened together. The camera 5 and plate 6 thus form a solid unit which is then placed adjacent the brace 1 in such a position that the wide end of the female member 8 overlaps the narrow end of the male member 9. The unitary camera 5 and base plate member 6 is then pushed forward until the members 8 and 9 are completely locked together. At this time the apparatus will appear as shown in Fig. 1. It is then ready to be placed against the shoulder of the cinematographer and a shot made.

As is well understood, different makes of motion picture cameras have different configurations and in order to adapt this apparatus to use with a number of different types of cameras, an adapter may be provided for each individual camera. Fig. 6 shows a square shaped base plate or adapter 12 to conform to the shape of a standard Eastman Cine-Kodak. An aperture 13 exactly similar to the aperture 8 of Fig. 3 is provided in the base of the adapter 12 so that the base may be mounted upon the brace 1 in a manner already described. A recessed screw 14 is adapted to mate with a threaded aperture (not shown) in the base of the Cine-Kodak.

Fig. 7 shows a base or adapter 15 which is shaped to fit a Victor 16 mm. motion picture camera. It has an aperture 16 exactly similar to the aperture 8 of Fig. 3 and adapted to mate with the member 9 in the same manner as described above. A screw 17 similar to the screw 7 is so placed that it will mate with a threaded aperture (not shown) in the base of the Victor camera, to firmly support such camera.

Thus it will be seen that a single support may be used for a plurality of different types of motion picture cameras and by holding the apparatus as if it were a rifle with the right hand grasping the member 4 and the left hand grasping the handle 10, the camera will be rigidly supported and an action scene may be easily and accurately photographed.

Having thus described the invention what is claimed as new and desired to secure by Letters Patent is:

1. A camera support comprising a brace having a shoulder rest and a hand grip integral therewith, said brace having above said hand grip means for receiving the base of a motion picture camera, means for detachably securing the camera to said means, and a handle for the camera whereby said hand grip is adapted to be engaged by one hand of the operator, and said handle by the other.

2. A camera support comprising a brace having a shoulder rest and a hand grip integral therewith, said brace having above said hand grip means for receiving the base of a motion picture camera for supporting the camera in an upright position, means for detachably securing the camera to said means, and a handle for the camera whereby said hand grip is adapted to be engaged by one hand of the operator, and said handle by the other.

3. A camera support comprising a brace having a shoulder rest and a hand grip integral therewith, said brace having above said hand grip an adapter for receiving the base of a motion picture camera, means for detachably securing said adapter to said brace, means for detachably securing the camera to said adapter, a handle for said camera, and means for detachably securing said handle to the side of the camera, whereby said hand grip is adapted to be engaged by one hand of the operator and said handle by the other.

4. A camera support comprising a brace having a shoulder rest and a hand grip integral therewith, said brace having above said hand grip an adapter for receiving the base of a motion picture camera for supporting the camera in an upright position, means for detachably securing said adapter to said brace, means for detachably securing the camera to said adapter, a handle for said camera, and means for detachably securing said handle to the side of the camera, whereby said hand grip is adapted to be engaged by one hand of the operator, and said handle by the other.

JACK M. WARNER.